United States Patent [19]
Matsushiba et al.

[11] Patent Number: 6,016,549
[45] Date of Patent: Jan. 18, 2000

[54] PERIPHERAL UNIT HAVING AT LEAST TWO SEQUENCER CIRCUITS CONFIGURED TO CONTROL DATA TRANSFERS FOR POWER SAVING

[75] Inventors: Takuji Matsushiba, Ebina; Satoshi Karube, Kamakura, both of Japan

[73] Assignee: International Business Machines Corporation, Armonk, N.Y.

[21] Appl. No.: 08/863,898

[22] Filed: May 27, 1997

[30] Foreign Application Priority Data

Jun. 14, 1996 [JP] Japan .................................. 8-153657

[51] Int. Cl.[7] .................................................... G06F 1/32
[52] U.S. Cl. ........................ 713/324; 713/322; 713/323; 713/330; 710/8
[58] Field of Search ..................... 360/78.04; 365/227; 370/392; 395/115, 200.41, 828; 455/574; 710/169, 9, 8; 709/211; 329/114; 713/310, 320, 322, 323, 324, 330, 340

[56] References Cited

U.S. PATENT DOCUMENTS

| | | | |
|---|---|---|---|
| 3,629,862 | 12/1971 | Chow ...................................... | 711/169 |
| 4,700,292 | 10/1987 | Campanini .......................... | 395/200.41 |
| 4,933,785 | 6/1990 | Morehouse et al. .................. | 360/78.04 |
| 5,058,203 | 10/1991 | Inagami .................................... | 455/574 |
| 5,274,641 | 12/1993 | Shobatake et al. ...................... | 370/392 |
| 5,378,935 | 1/1995 | Korhonen et al. ...................... | 327/114 |
| 5,473,572 | 12/1995 | Margeson, III .......................... | 365/227 |
| 5,511,152 | 4/1996 | Lai et al. ................................. | 395/115 |
| 5,691,948 | 11/1997 | Sakabe ..................................... | 365/227 |

*Primary Examiner*—Thomas C. Lee
*Assistant Examiner*—Harold Kim
*Attorney, Agent, or Firm*—Monica D. Lee; Randall J. Bluestone

[57] ABSTRACT

It is the object of the present invention to provide an improved peripheral unit, incorporating an MPU, that can reduce power consumption appropriately in accordance with mode transition when a host command from a host computer system is being processed, and a control method therefor. An MPU that requires a large amount of power, for example, is activated only when necessary, such as for the processing of a command (host command) from a computer system (host), and is deactivated during all other periods, by relinquishing the right of controlling of the operations to the respective sequencer circuits. The first sequencer circuit is activated only when necessary, such as for the transfer of data to the computer system. For the hardware operation of a device (e.g., writing data to or reading data from the device), the first sequencer circuit is deactivated, relinquishing the control right of that operation to the second sequencer circuit. On the other hand, for the transfer of data to the computer system, the second sequencer circuit is deactivated, relinquishing the control right of that operation to the first sequencer circuit. The respective circuits in the peripheral unit can be deactivated any time as needed in accordance with the state of the data transfer operation, which is performed between the host computer system and the peripheral unit.

31 Claims, 6 Drawing Sheets

| Phase | Host | PC Card 100 State | First Sequencer Circuit 21 | Second Sequencer Circuit 22 | MPU 10 | Flash Memory 50 |
|---|---|---|---|---|---|---|
| 1 | | State #0 | (Wait for Issue of Host Command) | | | |
| 2 | Issue write command | State #2 | Request activation of MPU 10 | | | |
| 3 | | State #6 ↓ State #4 | | | Interpret host command and set parameter for sequencer circuits | |
| 4 | | State #7 ↓ State #1 | Request host transfer data | Transmit write command to flash memory 50 ↓ Wait until buffer full | Request activation of sequencer circuit | Receive write command ↓ Ready |
| 5 | Begin data transfer | State #2 | Begin writing to data buffer 33 | | | |
| 6 | End data transfer | State #3 | Buffer full | Read from data buffer 33 | | Write data |
| 7 | | State #1 | | End reading from data buffer 33 ↓ Read status of flash memory | | End data writing ↓ Return a status |
| 8 | | State #5 | | Inform MPU data transfer ends | End process | |
| 9 | | State #4 | | | Terminate end process | |

FIG. 2

| Phase | Host | PC Card 100 State | First Sequencer Circuit 21 | Second Sequencer Circuit 22 | MPU 10 | Flash Memory 50 |
|---|---|---|---|---|---|---|
| 21 | | State #0 (phase 21) | (Wait for Issue of Host Command) | | | |
| 22 | Issue read command | State #2 (phase 22) | Request activation of MPU 10 | | | |
| 23 | | State #6 ↓ State #4 (phase 23) | | | Interpret host command and set parameter for sequencer circuits | |
| 24 | | State #7 ↓ State #1 (phase 24) | Wait until buffer full | Transmit read command to flash memory 50 ↓ Wait until ready | | Receive read command |
| 25 | | State #0 ↓ State #1 (phase 25) | | Begin writing to data buffer 33 | | Ready ↓ Begin data transfer |
| 26 | | State #3 ↓ State #0 (phase 26) | Request host transfer data | Buffer full | | End data transfer |
| 27 | Begin data transfer | State #2 (phase 27) | Begin reading from data buffer 33 | | | |
| 28 | End data transfer | State #2 ↓ State #6 (phase 28) | End reading from data buffer 33 ↓ Inform MPU 10 data transfer ends | | End process | |
| 29 | | State #4 (phase 29) | | | Terminate end process | |

*FIG. 3*

| Phase | Host | PC Card 100 State | First Sequencer Circuit 21 | Second Sequencer Circuit 22 | MPU 10 | Flash Memory 50 |
|---|---|---|---|---|---|---|
| 41 | | State #0 | (Wait for Issue of Host Command) | | | |
| 42 | Issue read command | State #2 | Request activation of MPU 10 | | | |
| 43 | | State #6 ↓ State #4 | | | Interpret host command and set parameter for sequencer circuits | |
| 44 | | State #7 ↓ State #1 | Wait until buffer full | Transmit read command to flash memory 50 ↓ Wait until ready | | Receive read command |
| 45 | | State #0 ↓ State #1 | | Begin writing to data buffer 33 | | Ready ↓ Begin data transfer |
| 46 | | State #1 | | ECC error | | End data transfer |
| 47 | | State #5 ↓ State #4 | | Inform MPU 10 | Begin error correction, Write error corrections | |
| 48 | | State #4 ↓ State #7 ↓ State #0 | Request host transfer data | Buffer full | End data correction ↓ Request activation of second sequencer circuit 22 | |
| 49 | Begin data transfer | State #2 | Begin reading from data buffer 33 | | | |
| 50 | End Data transfer | State #6 | End reading from data buffer 33 ↓ Inform MPU 10 data transfer is completed | | End process | |
| 51 | | State #4 | | | Terminate end process | |

*FIG. 4*

| State | MPU 10 | First Sequencer Circuit 21 | Second Sequencer Circuit 22 |
|---|---|---|---|
| 0 | — | — | — |
| 1 | — | — | ○ |
| 2 | — | ○ | — |
| 3 | — | ○ | ○ |
| 4 | ○ | — | — |
| 5 | ○ | — | ○ |
| 6 | ○ | ○ | — |
| 7 | ○ | ○ | ○ |

※ ○ : Clock supplied (active)

— : Clock cut off (inactive)

*FIG. 6*

PERIPHERAL UNIT HAVING AT LEAST TWO SEQUENCER CIRCUITS CONFIGURED TO CONTROL DATA TRANSFERS FOR POWER SAVING

FIELD OF THE INVENTION

The present invention relates to a peripheral unit adapted to a host computer system, such as a personal computer. More specifically, the present invention pertains to a peripheral unit that incorporates an MPU for processing a command generated by the host computer system.

BACKGROUND OF THE INVENTION

In accordance with recent advances in technology, various types of personal computers (PCs), such as desktop computers and notebook computers, have been developed and are currently being sold on the market. End users may purchase PCS having the standard components (e.g., a main processor, a main memory and other basic devices) for providing the basic system configuration. Additionally, end users may enhance or extend the capabilities of his or her PC by installing various peripheral devices.

Peripheral units referred to as "extended adaptor cards" are used to provide PCs with expanded capabilities. Unfortunately, extended adapter cards typically do not satisfy the constraints (e.g., weight limitations and high component density) required to produce compact, light, portable notebook computers. As such, a peripheral unit referred to as a "PC card", was developed which has the capability to expand the system configuration of portable notebook computers. PC cards are adapted to notebook computers that include a connector for the electrical connection of a PC card, and a PC card slot large enough to retain a PC card (see FIG. 5).

The existing mechanical and electrical specifications of the PC card were defined primarily by the PCMCIA (Personal Computer Memory Card International Association) and the JEIDA (Japan Electronic Industry Development Association). Presently, the PC card specification defines three types of PC cards: Type I, which is 3.3 mm thick; Type II, which is 5.5 mm thick; and Type III, which is 10.5 mm thick. Type I cards are used primarily as memory cards. Type II cards are used primarily as FAX/modem cards, Ethernet adaptor cards, and SCSI (Small Computer System Interface) adaptor cards. Type III cards are used primarily as cards that have built-in hard disks.

The PC card specification, released by the PCMCIA/JEIDA in 1995, defines the CardBus, and DMA (Direct Memory Access) support and multifunction cards, while maintaining compatibility with the prior PCMCIA Release 2.1 (JEIDA Version 4.2). The CardBus extends the internal bus width of a PC card from the conventional 16 bits to 32 bits, and increases the maximum clock speed to 33 MHZ and the maximum transfer rate to 132 Mbps. The CardBus is intended to be directly connected to a PCI (Peripheral Component Interconnect) bus which is a local bus for a computer (hereinafter referred to as a "host").

By adopting the CardBus, highly functional PC cards can be achieved, such as high speed Ethernet cards, high speed memory cards, and multimedia cards that can handle graphics and moving pictures. The CardBus typically requires a PC card that incorporates an MPU such that the PC card can serve as a bus master, and can obtain the right for controlling the system bus of the host. This differs greatly from a conventional PC card that serves merely as a bus slave.

Many PC cards of the previous version also incorporate an MPU for controlling the internal operation of the PC card, or for providing a cooperative transaction, such as data exchange, with the host computer.

One problem encountered in designing a PC card which includes a general purpose MPU, rather than a special purpose LSI (Large Scale Integrated) circuit whose applications are specific, is that the power consumption may be increased due to a larger number of gates in an MPU. However, under certain circumstances, it may be desirable to use an MPU rather than a special purpose LSI, despite the possible increase in power consumption. For example, the use of an MPU is typically required when the special purpose LSI is not capable of supporting all the functional capabilities of the PC card. Thus, reducing the power consumption of a PC card which includes an MPU is a concern for PC card designers, especially if the PC card is used in conjunction with a host computer that is a battery operated notebook computer.

One method for reducing the power consumption (power management) in a conventional PC card is to collectively halt the operating clocks for an MPU and its peripheral circuits after a series of operations has been completed. With this method, however, the MPU is driven continuously during a period when the PC card is operating at a more or less reduced capacity, such as during a period when data is being exchanged with a computer system. So long as the MPU, which requires a large amount of power, is driven continuously, the amount of saved power is limited.

SUMMARY OF THE INVENTION

It is one object of the present invention to provide an improved peripheral unit, such as a PC card, that is adapted to a host computer system, and a control method therefor.

It is another object of the present invention to provide an improved peripheral unit, such as a PC card incorporating an MPU, that can reduce power consumption in accordance with mode transitions when a command from a host computer system is being processed, and a control method therefor.

To achieve the above objects, according to one embodiment of the present invention, a peripheral unit, which is adapted to a host computer system, comprises: (a) a device to be accessed by the computer system; (b) a clock generator for supplying clock signals to respective sections; (c) a first interface circuit for executing data exchange with the computer system; (d) a second interface circuit for executing data exchange with the device; (e) a data buffer for temporarily storing transferred data; (f) an MPU for fully controlling internal operations of the respective sections; (g) a first sequencer circuit for, on behalf of the MPU, controlling data exchange via the first interface circuit; and (h) a second sequencer circuit for, on behalf of the MPU, controlling the data exchange via the second interface circuit.

According to another embodiment of the present invention, a control method, for a peripheral unit that is adapted to a host computer system and that comprises a device to be accessed by the computer system, a first interface circuit for executing data exchange with the computer system, a second interface circuit for executing data exchange with the device, a data buffer for temporarily storing transferred data, an MPU for fully controlling internal operations of the respective sections, a first sequencer circuit for, on behalf of the MPU, controlling data exchange via the first interface circuit, a second sequencer circuit for, on behalf of the MPU, controlling data exchange via the second interface circuit, and a clock generator for supplying clock signals to respective sections, comprises the steps of:

(a) the first interface circuit receiving a data write command from the computer system; (b) the first sequencer circuit being activated upon receipt of a data write command to issue an activation request to the MPU and then halting again; (c) the MPU being activated in response to the activation request at the step (b), interpreting the data write command that is received, setting a parameter for the first and the second sequencer circuits, issuing an activation request to the first and the second sequencer circuits, and then halting again; (d) the first sequencer circuit being activated, issuing a data transfer request to the computer system in accordance with the parameter set by the MPU, and then halting again; (e) the second sequencer circuit being activated, and issuing a data write command to the device in accordance with the parameter set by the MPU; (f) the first sequencer circuit being activated in response to the computer system beginning to transfer data that have been written, writing the data into the data buffer; (g) the second sequencer circuit halting again if the data buffer is not full when the device enters a write ready state; (h) the first sequencer circuit halting again when at the step (f) the data buffer is full; (i) the second sequencer circuit being activated, and writing contents of the data buffer to the device when the data buffer is filled and the device enters the write ready state; (j) the second sequencer circuit being activated, transmitting to the MPU a notification that writing of the contents of the data buffer at the step (i) is completed, and then halting again; (k) the MPU being activated in response to a notification at the step (j) to perform an end process for the data write command; and (l) halting again in response to termination of the end process at the step (k).

An MPU, that requires a large amount of power, is activated only when necessary, such as for the processing of a command (host command) from a computer system (host), and is deactivated at all other times, relinquishing control right of the internal operations to the respective sequencer circuits. The first sequencer circuit is activated only when necessary, such as for the data transfer to the computer system. For the hardware operation of a device (e.g., data writing to or data reading from the device), the first sequencer circuit is deactivated, relinquishing the control right of the internal operation to the second sequencer circuit. On the other hand, for the transfer of data to the computer system, the second sequencer circuit is deactivated, relinquishing the control right of the internal operation to the first sequencer circuit.

The other objects, features, and advantages of the present invention will become apparent in due course during the detailed description of the embodiment of the present invention, which will be given while referring to the accompanying drawings.

BRIEF DESCRIPTION OF THE DRAWINGS

The present invention is illustrated by way of example and not limitation in the figures of the accompanying drawings, in which like references indicate similar elements, and in which:

FIG. 2 is a table illustrating the states of the various components within one embodiment of the PC card when a data write command is issued to the PC card;

FIG. 3 is a table illustrating the states of the various components within one embodiment of the PC card when a data read command is issued to the PC card;

FIG. 4 is a table illustrating the states of the various components within one embodiment of the PC card when an ECC error occurs in read data;

FIG. 6 illustrates the various states of the MPU and the first and second sequence circuits during a read or write host command.

DETAILED DESCRIPTION OF THE PREFERRED EMBODIMENT

Figure 1:
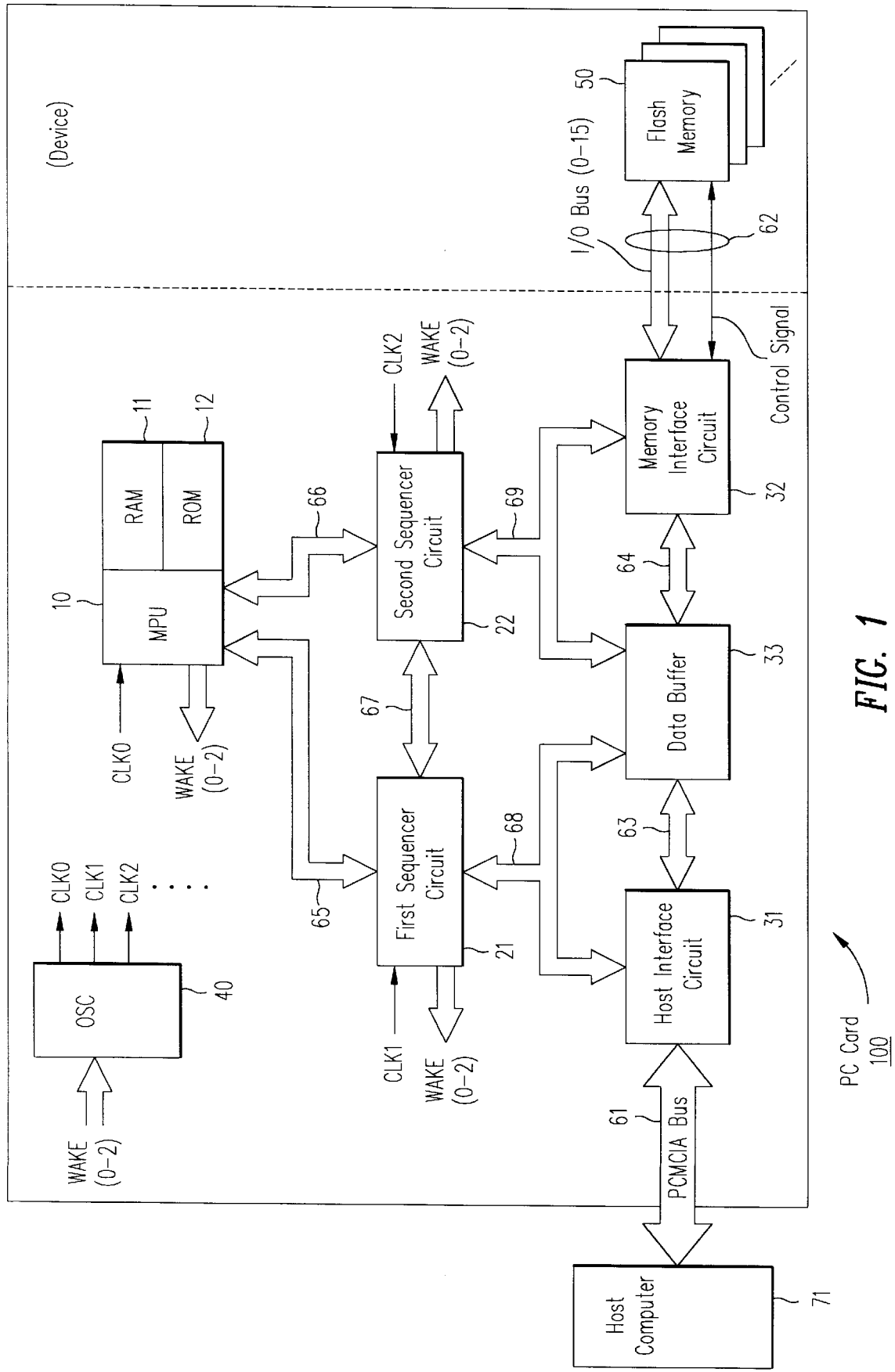
FIG. 1 is a block diagram illustrating a PC card 100 according to the present invention.
Figure 5:
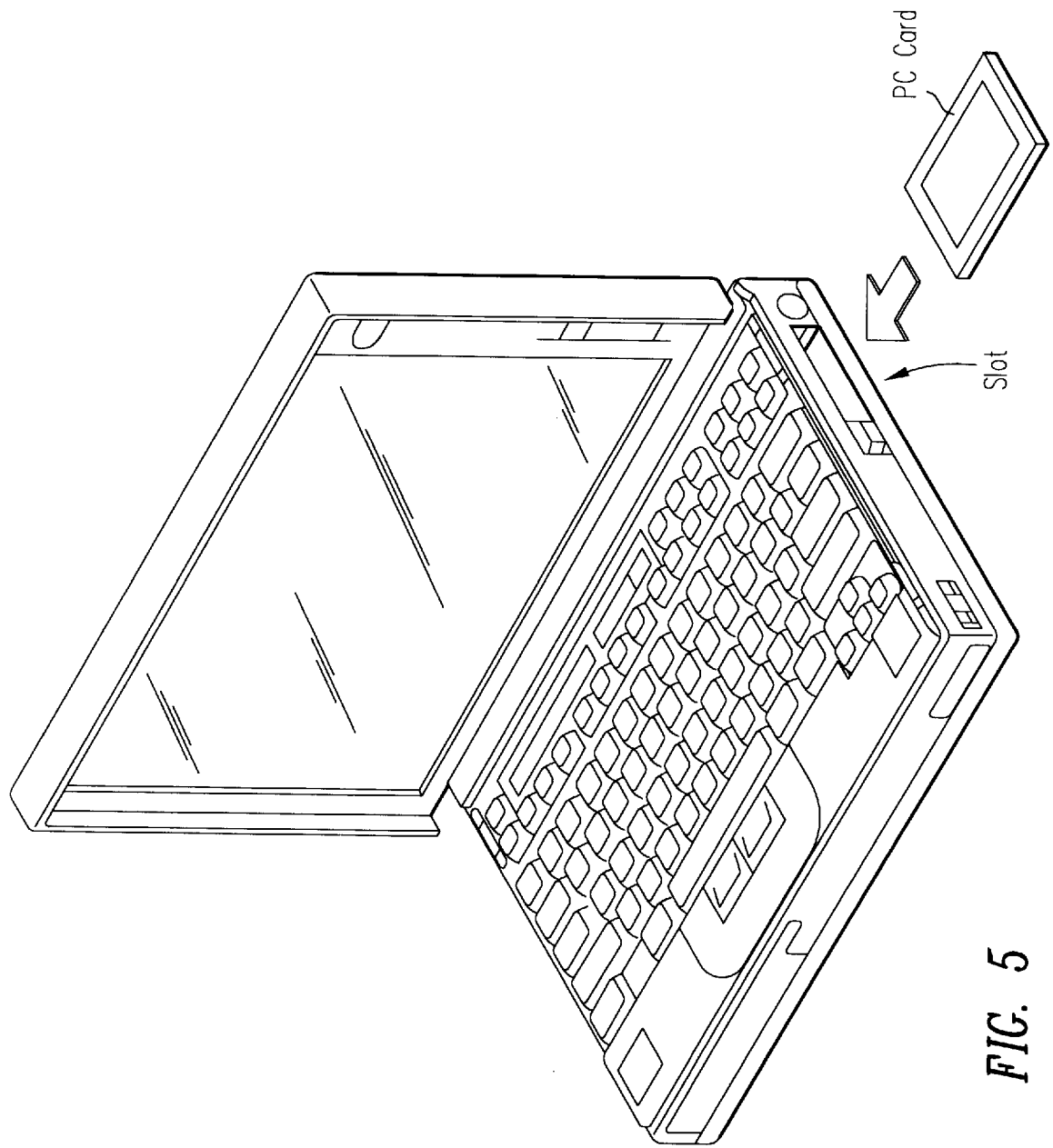
FIG. 5 illustrates a PC card prior to being inserted into a notebook computer.

One embodiment of the present invention will now be described in detail while referring to the drawings.

Although electric circuits and components other than those shown in FIG. 1 will be required when fabricating a PC card, as they are well known to one having ordinary skill in the art, and are not related to the subject of the present invention, no explanation for them will be given in this specification. An ordinary personal computer currently available on the market will suffice as the computer system (hereinafter also referred to as a "host") into which the PC card 100 can be inserted, and as it is not related to the subject of the present invention, no detailed explanation for its structure will be given.

FIG. 1 illustrates a PC card 100 that embodies the present invention. According to FIG. 1, one embodiment of the PC card 100 includes an MPU 10, a first sequencer circuit 21, a second sequence circuit 22, a host interface circuit 31, a flash memory device 50, a memory interface circuit 32, a data buffer 33, and an oscillator (OSC) 40. The PC card 100 is typically inserted into a compatible card slot (not shown) of the host.

The MPU 10 is a general purpose type controller chip that is capable of fully controlling the internal operation of the PC card 100. The MPU 10 may be a 16-bit microcomputer chip that operates at 4.5 MHZ and requires a plurality of clocks (e.g., four clocks) to execute one instruction (or command). Coupled to the MPU 10 is a ROM 12 (read-only memory) for permanently storing an initialization test program and hardware operation code (microcode), and a RAM 11 (random access memory) for providing a work area for the MPU 10.

The MPU 10 is responsible for processing a host command issued to the PC card 100 by the host. Generally, the PC card 100 cannot be driven directly based on the contents of the host command; but rather, the MPU 10 interprets the host command in accordance with the microcode stored in the ROM 12 prior to executing the host command.

The host interface circuit 31 employs an interface protocol for interfacing with the host 71 into which the PC card 100 is inserted. The host interface circuit 31 is typically designed based on one of the standard specifications, such as the PCMCIA or the IDE (Integrated Drive Electronics) specifications. A PCMCIA bus 61 extending from the host interface circuit 31 communicates with a local host bus such as an ISA (Industry Standard Architecture) bus or a PCI bus (not shown). The host interface circuit 31 includes various registers (not shown), such as a "command register" for storing a command (e.g., host commands, including a write command and a read command) issued by the host; a "data register" for temporarily storing transferred data; an "address register" for storing an access destination; and a "status register" for storing a command processing result.

The flash memory 50 serves as a memory device for the PC card 100. The device, however, need not necessarily be a flash memory to implement the subject of the present invention. The device may be a hard disk or a FAX/modem PC card. In short, the present invention can be extended to any PC card which is capable of exchanging data with a host.

The memory interface circuit 32 provides an interface between the flash memory 50 and the PC card 100 for exchanging data. The memory interface circuit 32 includes various registers (not shown), such as an "address register" for storing a physical address of the flash memory 50; a "data register" for temporarily storing transferred data; and a "status register" for storing the result of data writing/reading with regard to the flash memory 50. The memory interface circuit 32 communicates with the flash memory 50 across a memory bus 62, which may include an I/O bus having 16 data signal lines and a control signal line.

The data buffer 33 is used to temporarily store write data transferred by the host during the data writing operation, or read data from the flash memory 50 during the data reading operation. Typically, the rate in which data is written into the data buffer 33 is different from the rate in which data is read from the data buffer 33. The PC card 100 may be a flash memory card that emulates a HDD and may require the data buffer 33 to have a memory capacity equivalent to at least one sector (=256 words=512 bytes) of the emulated HDD. For one embodiment, the data buffer 33 requires 6 bytes for a header and 10 bytes for an ECC in addition to the 512 bytes for transferring data. The data buffer 33 communicates with the host interface circuit 31 and the memory interface circuit 32 via data buses 63 and 64, respectively. For one embodiment, the data buses 63 and 64 have a bus width of 16 bits.

The MPU 10 delegates control of the data transfer (including data writing and data reading) between the host and the data buffer 33 to the first sequencer circuit 21. The MPU 10 also delegates control of the data transfer (including data writing and data reading) between the flash memory 50 and the data buffer 33 to the second sequencer circuit 22. Although the MPU 10 has the capability of controlling these data transfer functions, the MPU 10 relinquishes control of these data transfer functions to the sequence circuits 21 and 22 for various reasons.

The MPU 10 may require four clock signals to execute one instruction in order to ensure general purpose use. In this situation, the MPU 10 typically operates at a speed higher than that at which its peripheral unit operates. For example, if the PCMCIA bus 61 is directly coupled to an ISA bus which is operating at a speed of 10 MHZ, the MPU 10 must operate at a speed of 40 MHZ (i.e., four times as high) in order to transfer data received via the ISA bus without delay. For one embodiment, the MPU 10 operates at 4.5 MHZ.

On the other hand, the first and the second sequencer circuits 21 and 22 may require only a single clock signal to execute one instruction when their functions are limited. For one embodiment, the first and second sequencer circuits 21 and 22 are limited to controlling the data transfer between the host/flash memory 50 and the data buffer 33. By restricting the function of the first and second sequencer circuits 21 and 22 in such a manner, the sequencer circuits 21 and 22 typically require less gates than the MPU 10 and, therefore, may process the data transfer faster than the MPU 10. Furthermore, the power consumed by the first and second sequencer circuits 21 and 22 is not as great as the power consumed by the MPU 10, and a smaller load is imposed on the host and the PC card 100.

A host command issued by the host to the PC card typically must be interpreted by the PC card 100 before the PC card 100 may execute the host command. A general purpose MPU, such as MPU 10, may be used to interpret the host command and then execute the host command. Unfortunately, the processing speed of the general purpose MPU is limited and the power consumption of the general purpose MPU may be undesirable. Although the first and second sequencer circuits 21 and 22 cannot interpret a host command, these circuits 21 and 22 may be used to execute specific host commands at a faster speed than the MPU 10 and with less power consumption.

For one embodiment, the MPU 10 and the sequencer circuits 21 and 22 interact with each other as follows:

(i) The MPU 10 interprets a host command, and sets for the sequencer circuits 21 and 22 parameters for the execution of the host command. For example, a transfer start address and a transfer word count (referred to as "nanocode" as opposed to "microcode" of the MPU 10) is set by the MPU 10.

(ii) The sequencer circuits 21 and 22 perform data transfer in accordance with the parameters set by the MPU 10.

The MPU 10 communicates with the first and the second sequencer circuits 21 and 22 across respective buses 65 and 66. The first sequencer circuit 21 and the second sequencer circuit 22 communicate with each other across a bus 67. The first sequencer circuit 21 employs a bus 68 to control data transfer between the host and the data buffer 33. The second sequencer circuit 22 employs a bus 69 to control data transfer between the flash memory 50 and the data buffer 33. Although, in FIG. 1, the sequencer circuits 21 and 22 are shown as separate independent functional blocks, they may be incorporated into a single integrated circuit (IC) device.

The oscillator (OSC) 40 generates multiple clock signals which are selectively supplied to the MPU 10 and the first and the second sequencer circuits 21 and 22. The OSC 40 in one embodiment divides a clock signal having a basic frequency of 18 MHZ into clock signals CLK0, CLK1 and CLK2, which are appropriate for driving the respective circuits. For one embodiment, the OSC 40 increases or attenuates the outputs of the clock signals CLK0, CLK1 and CLK2 in accordance with WAKE signals received from the MPU 10 and the first and the second sequencer circuits 21 and 22.

Each time the MPU 10 and the first and the second sequencer circuits 21 and 22 have completed an operation, they generate a WAKE signal to cut off the supply of a clock signal to themselves so that they halt. When the MPU 10 and the first and the second sequencer circuits 21 and 22 receive activation requests, they generate WAKE signals to resume the supply of clock signals so that they restart their operation. As a result, the eight different activity states used in FIGS. 2, 3 and 4, are shown in FIG. 6.

State #0 is the state where the MPU 10 and the first and the second sequencer circuits 21 and 22 are halted or inactive. State #1 is the state where only the second sequencer circuit 22 is active. State #2 is the state where only the first sequencer circuit 21 is active. State #3 is the state where the first and the second sequencer circuits 21 and 22 are active. State #4 is the state where only the MPU 10 is active. State #5 is the state where the MPU 10 and the second sequencer circuit 22 are active. State #6 is the state where the MPU 10 and the first sequencer circuit 21 are active. State #7 is the state where the MPU 10 and the first and the second sequencer circuits 21 and 22 are all active.

The operations relating to activation and/or deactivation of the MPU 10 and the first and the second sequencer circuits 21 and 22 will be described in detail below.

FIG. 2 illustrates the internal operation of the PC card 100 when a data write command is issued to the PC card 100. Phase 1 indicates the beginning and Phase 2 indicates the end of processing the data write command.

In the first phase (phase 1), the MPU 10 and the first and the second sequencer circuits 21 and 22 are in the inactive state or deactivated state (state #0), where the supply of clock signals is cut off, and are waiting for the issuance of a command by the host.

In the next phase (phase 2), a write command is issued by the host to the PC card 100, and the contents of the command are written in the registers of the host interface circuit 31. As the contents in the register of the host interface circuit 31 are changed, the first sequencer circuit 21, which is located very near the host interface circuit 31, is activated (state #2), and issues an activation request to the MPU 10.

In the following phase (phase 3), the MPU 10 resumes the supply of clocks to itself and is activated (state #6), interprets the host command written in the registers of the host interface circuit 31, and sets parameters, such as nanocode for a transfer start address or a transfer word count, to the first and the second sequencer circuits 21 and 22. The first sequencer circuit 21, which has terminated its operation, cuts off the supply of clock signals to itself and again deactivates (state #4).

In the next phase (phase 4), the MPU 10 issues an activation requests to the first and the second sequencer circuits 21 and 22 relinquishing the control of data transfer operation to them, and activating the first and the second sequence circuits 21 and 22 (state #7). The MPU 10 thereafter cuts off the supply of clock signals to itself and is again deactivated. The first sequencer circuit 21, on the other hand, after being reactivated issues a data transfer (write) request to the host in accordance with the parameter (nanocode) set by the MPU 10, and thereafter is deactivated until the host is ready. The second sequencer circuit 22 transmits a write command, which differs from a "write command" issued as a host command, to the flash memory 50 in accordance with the parameters (nanocode) set by the MPU 10. Upon receipt of the write command, the flash memory 50 enters the ready state indicating that it is ready to have data written into it. When the second sequencer circuit 22 receives the ready response from the flash memory 50, the data transfer to the flash memory 50 is enabled (state #1).

In the succeeding phase (phase 5), in response to the host entering the ready state, the first sequencer circuit 21 is reactivated, and begins writing data to the data buffer 33. Since, at this time, the data buffer 33 is not yet full and written data cannot be transferred to the flash memory 50, the second sequencer circuit 22 is temporarily deactivated (state #2).

In the following phase (phase 6), when the transfer of written data from the host is terminated and the data buffer 33 is full, the first sequencer circuit 21 issues an activation request to the second sequencer circuit 22. In response to this request, the second sequencer circuit 22 reads the contents of the data buffer 33 and transfers them to the flash memory 50 (state #3).

In the next phase (phase 7), the first sequencer circuit 21, which has terminated the writing of data into the data buffer 33, deactivates again (state #1). When the second sequencer circuit 22 completes the data transfer from the data buffer 33 to the flash memory 50, it reads the status of the flash memory 50 and confirms that the writing of data has successfully been terminated.

In the succeeding phase (phase 8), the second sequencer circuit 22 informs the MPU 10 that the writing of data has been terminated. In response to this notification, the MPU 10 is again activated (state #5), and performs an end process with the host (e.g., performs handshaking process with the host).

In the following phase (phase 9), after the second sequencer circuit 22 has transmitted a notification to the MPU 10, it again deactivates and only the MPU 10, which is performing the end process, is active (state #4).

When the MPU 10 has terminated the end process, the operation returns to state #0 to wait for the next host command.

FIG. 3 illustrates the internal operation of the PC card 100 when a data read command is issued to the PC card 100. Phase 21 indicates the beginning and Phase 29 indicates the end of processing the data read commands.

In the first phase (phase 21), the MPU 10 and the first and the second sequencer circuits 21 and 22 are in the inactive or deactivated state (state #0), where the supply of clock signals is cut off, to wait for the issuance of a command by the host.

In the next phase (phase 22), a read command is issued by the host to the PC card 100, and the contents of the command are written in the registers of the host interface circuit 31. As the contents in the registers of the host interface circuit 31 are changed, the first sequencer circuit 21, which is located very near the host interface circuit 31, is activated (state #2), and issues an activation request to the MPU 10.

In the following phase (phase 23), the MPU 10 resumes the supply of clocks to itself and is activated (state #6), interprets the host command written in the registers of the host interface circuit 31, and sets parameters, such as nanocode for a transfer start address or a transfer word count, to the first and the second sequencer circuits 21 and 22. The first sequencer circuit 21, which has terminated its operation, cuts off the supply of clock signals to itself, and again deactivates (state #4).

In the next phase (phase 24), the MPU 10 issues an activation request to the first and the second sequencer circuits 21 and 22 relinquishing the control right of data transfer operation to them, and activating the first and the second sequencer circuits 21 and 22 (state #7). The MPU 10 thereafter cuts off the supply of clock signals to itself and is again deactivated. The second sequencer circuit 22 transmits a read command, which differs from a "read command" issued as a host command, to the flash memory 50 in accordance with the parameters (nanocode) set by the MPU 10, and waits until the flash memory 50 enters the ready state (is prepared). Since, at this time, the data buffer 33 is not yet full and read data cannot be transferred to the host, the first sequencer circuit 21 again deactivates (state #1).

In the succeeding phase (phase 25), since data cannot be read from the flash memory 50 until the flash memory 50 receives a read command and enters the ready state indicating that data may now be read from it (is prepared), the second sequencer circuit 22 is temporarily deactivated (state #0). When the flash memory 50 is ready, the second sequencer circuit 22 is again activated and writes data from the flash memory 50 to the data buffer 33.

In the following phase (phase 26), when the data read from the flash memory 50 has been transferred and the data buffer 33 is full, the second sequencer circuit 22 issues an activation request to the first sequencer circuit 21 (state #3). At this time, the first sequencer circuit 21 issues a read data transfer (read) request to the host in accordance with the parameters (nanocode) set by the MPU 10. The first sequencer circuit 21 thereafter deactivates and waits for the host to enter the ready state. Since the second sequencer circuit 22 is not required after the data transfer to the data buffer 33, it is deactivated (state #0).

In the next phase (phase 27), in response to the host entering the ready state, the first sequencer circuit 21 is reactivated (state #2), and begins to transfer data (data reading) from the data buffer 33 to the host.

In the succeeding phase (phase 28), the first sequencer circuit 21 informs the MPU 10 that the data reading from the data buffer 33 has been terminated. In response to this notification, the MPU 10 is again activated (state #6), and performs an end process with the host (e.g., performs handshaking process with the host).

In the following phase (phase 29), the first sequencer circuit 21, is deactivated while the MPU 10 is activated to perform the end process (state #4).

When the MPU 10 has terminated the end process, the operation returns to the state #0 to wait for the issuance of the next host command.

FIG. 4 illustrates the internal operation of the PC card 100 when an ECC error occurs during the data read. Phase 41 indicates the beginning and Phase 49 indicates the end of processing a read data command.

In the first phase (phase 41), the MPU 10 and the first and the second sequencer circuits 21 and 22 are in the inactive or deactivated state where the supply of clocks to them is cut off (state #0). During state #0, the PC card 100 is waiting for the issuance of a command from the host.

In the next phase (phase 42), a read command is issued by the host to the PC card 100, and the contents of the command are written in the registers of the host interface circuit 31. As the contents in the registers of the host interface circuit 31 are changed, the first sequencer circuit 21, which is located very near the host interface circuit 31, is activated (state #2), and issues an activation request to the MPU 10.

In the following phase (phase 43), the MPU 10 resumes the supply of clocks to itself to be activated (state #6), interprets the host command written in the register of the host interface circuit 31, and sets parameters, such as nanocode for a transfer start address or a transfer word count, to the first and the second sequencer circuits 21 and 22. The first sequencer circuit 21, which has terminated its operation, cuts off the supply of clock signals to itself, and again deactivates (state #4).

In the next phase (phase 44), the MPU 10 issues an activation request to the first and the second sequencer circuits 21 and 22 in order to relinquish the control right of data transfer operation to them, and the first and the second sequence circuits 21 and 22 are activated (state #7). The MPU 10 thereafter cuts off the supply of clock signals to itself and again deactivates. The second sequencer circuit 22 transmits a read command, which differs from a "read command" issued as a host command, to the flash memory 50 in accordance with the parameters (nanocode) set by the MPU 10, and waits until the flash memory 50 enters the ready state (is prepared). Since, at this time, the data buffer 33 is not yet full and data read cannot be transferred to the host, the first sequencer circuit 21 again deactivates (state #1).

In the succeeding phase (phase 45), since data cannot be read from the flash memory 50 until the flash memory 50 receives a read command and enters the ready state, the second sequencer circuit 22 is temporarily deactivated (state #0). When the flash memory 50 is ready, the second sequencer circuit 22 is again activated and writes data from the flash memory 50 to the data buffer 33.

In this context, assume that the second sequencer circuit 22 has detected an Error Check and Correction (ECC) error in the read data that were written in the data buffer 33 (phase 46).

The second sequencer circuit 22 in one embodiment is designed to perform only specific functions, and is not capable of correcting an ECC error. In the next phase (phase 47), the second sequencer circuit 22 informs the MPU 10 of the occurrence of an ECC error in order for the MPU 10 to perform the error correcting operation. In response to this notification, the MPU 10 is reactivated (state #5), corrects the error, and writes the error correction to the data buffer 33. The second sequencer circuit 22 is deactivated while the MPU 10 is performing the ECC error correction operation.

In the following phase (phase 48), after the MPU 10 has corrected the error, the MPU 10 issues an activation request to the second sequencer circuit 22. Since the data buffer 33 is filled when the MPU 10 has written in the corrected data, the second sequencer circuit 22 issues an activation request to the first sequencer circuit 21 (state #7). At this time, the first sequencer circuit 21 issues a data transfer (read) request to the host in accordance with the parameters (nanocode) set by the MPU 10. The first sequencer circuit 21 thereafter deactivates and waits for the host to enter the ready state. Since the second sequencer circuit 22 and the MPU 10 have no operation to perform, they also halt (state #0).

In the next phase (phase 49), in response to the host entering the ready state, the first sequencer circuit 21 is reactivated (state #2), and begins data transfer (data reading) from the data buffer 33 to the host.

In the succeeding phase (phase 50), the first sequencer circuit 21 informs the MPU 10 that the data reading from the data buffer 33 has been terminated. In response to this notification, the MPU 10 is activated again (state #6), and performs an end process with the host (e.g., performing handshaking process with the host).

In the following phase (phase 51), the first sequencer circuit 21 is deactivated while the MPU 10 is activated to perform the end process (state #4).

When the MPU 10 has terminated the end process, the operation returns to state #0 to wait for the issuance of the next command.

The present invention has been described in detail while referring to a specific embodiment. However, it should be obvious to one having ordinary skill in the art that various modifications or revisions of the embodiment are possible within the scope of the present invention. A peripheral unit in the present invention is not limited to a PCMCIA/JEIDA PC card, but may be a peripheral unit according to other standards, such as IDE or SCSI. In addition, a PC card of the present invention is not limited to a flash memory card; the present invention may be applied to a PC card of another type, such as a memory (RAM) card, a FAX/modem card, or an HDD card. That is, although the present invention has been disclosed by using an example, it should not be limited to that example. To fully understand the subject of the present invention, the claims should be referred to.

As is described above in detail, according to the present invention, provided is an improved peripheral unit, such as a PC card incorporating an MPU, that can reduce power consumption in accordance with mode transition during when a command from a computer system is being processed, and a control method therefor.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are accordingly, to be regarded in an illustrative rather than a restricted sense.

What is claimed is:

1. A peripheral unit, which is adapted to be coupled to a computer system, comprising:

an MPU;

a sequencer circuit coupled to said MPU, wherein said MPU and said sequencer circuit are each configured to be selectively activated to perform a specific function and subsequently deactivated upon the completion of said specific function, and wherein said sequencer circuit comprises a first sequencer circuit configured to control data transfers and a second sequencer circuit configured to control data transfers; and a clock generating circuit coupled to said MPU and said sequencer circuit, wherein said clock generating circuit is configured to provide said MPU, when activated, a first clock signal, and to provide said first sequencer circuit, when activated, a second clock signal, and to provide said second sequencer circuit, when activated, a third clock signal, and, wherein said clock generating circuit is further configured to halt said first clock signal to said MPU when said MPU is deactivated, to halt said second clock signal to said first sequencer circuit when said first sequencer circuit is deactivated, and to halt said third clock signal to said second sequencer circuit when said second sequencer circuit is deactivated.

2. The peripheral unit of claim 1, wherein said clock generating circuit comprises:

a first input configured to receive a first clock control signal;

a second input configured to receive a second clock control signal; and a third input configured to receive a third clock control signal, wherein said first clock signal is provided to said MPU in response to said first clock control signal, said second clock signal is provided to said first sequencer circuit in response to said second clock control signal, and said third clock signal is provided to said second sequencer circuit in response to said third clock control signal.

3. The peripheral unit of claim 2, wherein each of said MPU, said first sequencer circuit, and said second sequencer circuit comprises a plurality of outputs configured to provide said first clock control signal, said second clock control signal, and said third clock control signal to said clock generating circuit.

4. The peripheral unit of claim 1, further comprising:

a memory device; and an interface circuit coupled to said first sequencer circuit, said second sequencer circuit, and said memory device, wherein said interface circuit is configured to execute data transfers between said computer system and said memory device.

5. The peripheral unit of claim 4, wherein said interface circuit comprises:

a first interface circuit coupled to said first sequencer circuit and configured to execute data transfers with said computer system;

a second interface circuit coupled to said memory device and said second sequencer circuit, and configured to execute data transfers with said memory device; and a data buffer coupled between said first interface circuit and said second interface.

6. The peripheral unit of claim 5, wherein said first sequencer circuit is configured to control said data transfers with said computer system via said first interface circuit, and said second sequencer circuit is configured to control said data transfers with said memory device via said second interface circuit.

7. The peripheral unit of claim 6, wherein during said data transfer, said first interface circuit is capable of being activated to receive a data transfer command from said computer system.

8. The peripheral unit of claim 7, wherein during said data transfer, said MPU is capable of being activated to process said data transfer command and to provide at least one parameter for said first and second sequencer circuits.

9. The peripheral unit of claim 8, wherein during said data transfer, said first and second sequencer circuits are capable of being activated to control the transfer of data between said computer system and said memory device.

10. The peripheral unit of claim 9, wherein during said data transfer, said first sequencer circuit is capable of being activated to provide a data transfer request to said computer system in accordance with at least one of said parameters, and said second sequencer circuit is capable of being activated to provide a data write command to said memory device.

11. The peripheral unit of claim 10, wherein during said data transfer, said first interface circuit is capable of receiving data from said computer system and providing said data to said data buffer under the control of said first sequencer circuit, and said second interface circuit is capable of receiving said data from said data buffer and providing said data to said memory device under the control of said second sequencer circuit.

12. The peripheral unit of claim 9, wherein during said data transfer, said second sequencer circuit is capable of being activated to provide a data read command to said memory device in accordance with at least one of said parameters, and said first sequencer circuit is capable of being activated to provide a data transfer request to said computer system.

13. The peripheral unit of claim 12, wherein during said data transfer, said second interface circuit is capable of receiving data from said memory device and providing said data to said data buffer under the control of said second sequencer circuit, and said first interface circuit is capable of receiving said data from said data buffer and providing said data to said computer system under the control of said first sequencer circuit.

14. The peripheral unit of claim 13, wherein during said data transfer, said second sequencer circuit is capable of detecting an ECC error and transmitting an error signal to said MPU, and wherein said MPU is capable of being activated in response to said error signal to correct said ECC error.

15. The peripheral unit of claim 4, wherein during a data transfer between said computer system and said memory device, said first sequencer circuit and said second sequencer circuit are selectively activated to control said data transfer, and said MPU is selectively deactivated to relinquish control of said data transfer.

16. The peripheral unit of claim 4, wherein said memory device is a flash memory device.

17. A computer system, comprising:

a host computer; and a peripheral unit coupled to said host computer, said peripheral unit including an MPU coupled to a sequencer circuit, wherein said sequencer circuit comprises a first sequencer circuit configured to control data transfers and a second sequencer circuit configured to control data transfers, and wherein said MPU and said sequencer circuit are each configured to be independently activated to perform a specific function and subsequently independently deactivated upon the completion of said specific function, said peripheral unit further including a clock generating circuit coupled to said MPU and said sequencer circuit, wherein said clock generating circuit is configured to provide said MPU, when activated, a first clock signal, and to provide said first sequencer circuit, when activated, a second clock signal, and to provide said second sequencer circuit, when activated, a third clock signal, and wherein said clock generating circuit is further configured to halt said first clock signal to said MPU when said MPU is deactivated, to halt said second clock signal to said first sequencer circuit when said first sequencer circuit is deactivated, and to halt said third clock signal to said second sequencer circuit when said second sequencer circuit is deactivated.

18. The computer system of claim 17, wherein said peripheral unit further comprises:
  a memory device; and
  an interface circuit coupled to said first sequencer circuit, said second sequencer circuit, and said memory device, wherein said interface circuit is configured to execute data transfers between said computer system and said memory device.

19. The computer system of claim 18, wherein said interface circuit comprises:
  a first interface circuit coupled to said first sequencer circuit and configured to execute data transfers with said computer system;
  a second interface circuit coupled to said memory device and said second sequencer circuit, and configured to execute data transfers with said memory device; and
  a data buffer coupled between said first interface circuit and said second interface.

20. The computer system of claim 18, wherein during a data transfer between said computer system and said memory device, said first sequencer circuit and said second sequencer circuit are selectively activated to control said data transfer, and said MPU is selectively deactivated to relinquish control of said data transfer.

21. A method for reducing the power consumption of a peripheral unit, which is adapted to be coupled to a computer system, comprising the steps of:
  (a) selectively activating a first sequencer circuit to provide an MPU with a data transfer command from said computer system, and subsequently deactivating said first sequencer circuit, wherein step (a) comprises the steps of:
    (1) activating said first sequencer circuit in response to said data transfer command;
    (2) generating an MPU activation signal;
    (3) providing said data transfer command to said MPU; and
    (4) deactivating said first sequencer circuit after step (3) is completed;
  (b) selectively activating said MPU independently of said first sequencer circuit to process said data transfer command and to configure at least one parameter for said first sequencer circuit and a second sequencer circuit, and subsequently deactivating said MPU independently of said first and second sequencer circuits, wherein step (b) comprises the steps of:
    (1) activating said MPU in response to said MPU activation signal;
    (2) processing said data-transfer-command;
    (3) configuring at least one of said parameters for said first and second sequencer circuits;
    (4) generating first and second sequencer activation request signals; and
    (5) deactivating said MPU after step (4) is completed;
  (c) selectively activating said first and second sequencer circuits to control a data transfer between said computer system and a memory device in accordance with at least one of said parameters, and subsequently deactivating said first and second sequencer circuits, wherein step (c) comprises the steps of:
    (1) activating said first and second sequencer circuits in response to said first and second sequencer circuits activation request signals, respectively;
    (2) generating a data transfer request for said computer system in accordance with at least one of said parameters;
    (3) deactivating said first sequencer circuit after step (2) is completed; and
    (4) generating a data write command for said memory device in accordance with at least one of said parameters;
  (d) performing said data transfer, wherein step (d) comprises the steps of:
    (1) performing a data transfer from said computer system to a data buffer, and wherein step (d)(1) comprises the steps of:
      (i) activating said first sequencer circuit at the start of said data transfer from said computer system;
      (ii) performing said data transfer from said computer system to said data buffer; and
      (iii) deactivating said first sequencer circuit when said data buffer is full; and
    (2) performing a data transfer from said data buffer to said memory device; and
  (e) selectively activating said MPU to perform an end processing step specified by said data transfer command, and subsequently deactivating said MPU.

22. The method of claim 21, wherein step (d)(2) comprises the steps of:
  (i) if said memory device enters a ready state in response to said data write command before said data buffer is full, deactivating said second sequencer circuit;
  (ii) activating, if necessary, said second sequencer circuit when said data buffer is full; and
  (iii) performing said data transfer from said data buffer to said memory device.

23. The method of claim 22, wherein step (e) comprises the steps of:
  (1) notifying said MPU that step (d)(2)(iii) is completed;
  (2) deactivating said second sequencer circuit after step (1) is completed;
  (3) activating said MPU to perform said end processing step for said data transfer command; and
  (4) deactivating said MPU at the termination of said end processing step after step (3).

24. The method of claim 21, wherein step (c) further comprises the steps of:
  (5) activating said first and second sequencer circuits in response to said first and second sequencer circuits activation request signals, respectively;
  (6) generating a data read command for said memory device in accordance with at least one of said parameters; and
  (7) deactivating said second sequencer circuit after step (6) is completed.

25. The method of claim 24, wherein step (d) further comprises the steps of:
  (3) performing a data transfer from said memory device to said data buffer; and (4) performing a data transfer from said data buffer to said computer system.

26. The method of claim 25, wherein step (d)(3) further comprises the steps of:
(i) activating said second sequencer circuit when said memory device enters a ready state in response to said data read command;
(ii) performing said data transfer from said memory device to said data buffer; and
(iii) deactivating said second sequencer circuit when said data buffer is full.

27. The method of claim 26, wherein step (d) (4) comprises the steps of:
(i) if said data buffer is not full before said first sequencer circuit activation request signal is received by said first sequencer circuit deactivating said first sequencer circuit;
(ii) activating, if necessary, said first sequencer circuit when said data buffer is full;
(iii) generating a data transfer request for said computer system in accordance with at least one of said parameters;
(iv) deactivating said first sequencer circuit after step (iii) is completed;
(v) activating said first sequencer circuit at the start of said data transfer to said computer system; and
(vi) performing said data transfer from said buffer to said computer system.

28. The method of claim 27, wherein step (e) comprises the steps of:
(1) notifying said MFU that step (d)(4)(vi) is completed;
(2) deactivating said first sequencer circuit after step (1) is completed;
(3) activating said MPU to perform said end processing step from said data transfer command; and
(4) deactivating said MPU after step (3) is completed.

29. The method of claim 26, wherein step (d)(3) (ii) comprises the steps of:
(A) starting said data transfer from said memory device to said data buffer;
(B) detecting an ECC error;
(C) transmitting an error signal to said MPU to notify said MPU of said ECC error;
(D) deactivating said second sequencer circuit after step (C) is completed;
(E) activating said MPU in response to said error signal;
(F) correcting said ECC error; and
(G) deactivating said MPU after step (F) is completed.

30. A method for reducing the power consumption of a peripheral unit during a data transfer operation between said peripheral and a computer system, comprising the steps of:
(a) activating an MPU during said data transfer operation such that said MPU may process a data transfer command and activating said MPU during said data transfer operation such that said MPU may perform an ECC error correction;
(b) deactivating said MPU after said MPU has completed any of the functions specified in step (a);
(c) activating a first sequencer circuit during said data transfer operation such that said first sequencer circuit may receive said data transfer command from said computer system, generate a data transfer request for said computer system, or transfer data between said computer system and a data buffer;
(d) deactivating said first sequencer circuit after said first sequencer circuit has completed any of the functions specified in step (c);
(e) activating a second sequencer circuit during said data transfer operation such that said second sequencer circuit may generate a data command for said memory device, or transfer data between said memory device and said data buffer; and
(f) deactivating said second sequencer circuit after said second sequencer circuit has completed performing any of the activities specified in step (e), wherein said MPU, said first sequencer circuit, and said second sequencer circuit are each independently activated and deactivated.

31. The method of claim 30, wherein step (a) further comprises the step of activating said MPU during said data transfer operation such that said MPU may perform an end process specified by said data transfer command.

* * * * *